June 29, 1937.　　A. L. FOX ET AL　　2,085,077
INSULATOR
Filed Dec. 14, 1935　　2 Sheets-Sheet 1

INVENTORS:　A. L. FOX
　　　　　　F. V. HASKELL
　　　　　　W. C. STURZENEGGER
BY J. MacDonald
ATTORNEY June 29, 1937.    A. L. FOX ET AL    2,085,077
INSULATOR
Filed Dec. 14, 1935    2 Sheets-Sheet 2
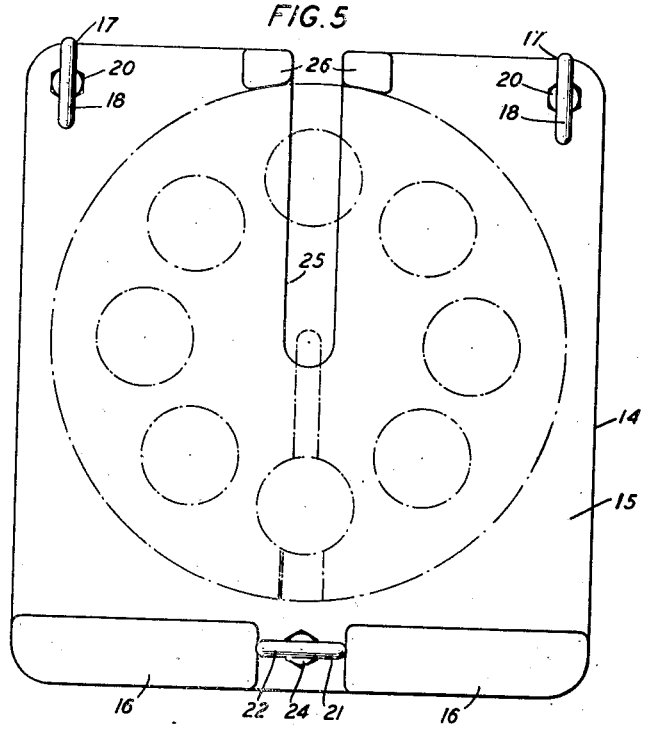
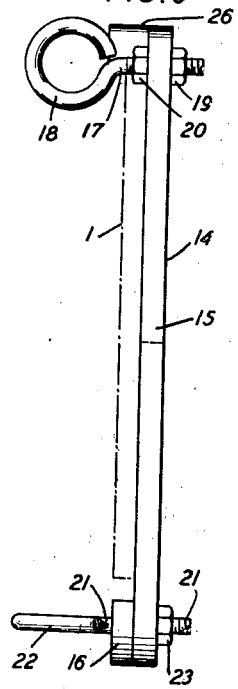
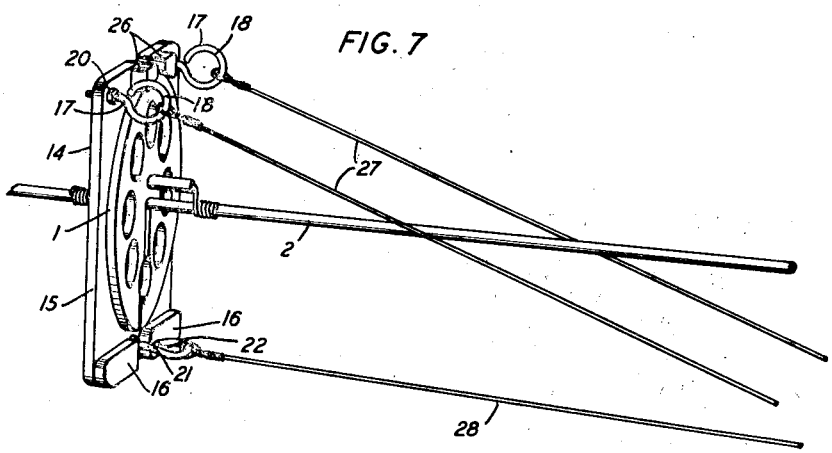
INVENTORS: A. L. FOX
F. V. HASKELL
W. C. STURZENEGGER
BY J. MacDonald
ATTORNEY Patented June 29, 1937

2,085,077

UNITED STATES PATENT OFFICE 2,085,077

INSULATOR

Arthur L. Fox, Upper Montclair, N. J., Frederic V. Haskell, Stamford, Conn., and William C. Sturzenegger, Chester, N. J., assignors to Bell Telephone Laboratories, Incorporated, New York, N. Y., a corporation of New York Application December 14, 1935, Serial No. 54,434

3 Claims. (Cl. 173—28)

This invention relates to insulators and more particularly to insulators for line wires of electrical systems.

The object of this invention is to maintain the spacing of line wires at a predetermined distance from line wires adjacent thereto to prevent contacting.

A feature of this invention resides in the particular structure of the insulating member.

Another feature resides in the means for securing the insulator to the line wire.

In the drawings:

Fig. 2 is drawn on an enlarged scale relative to Fig. 1;

Fig. 5 is a plan view of a suitable towing device in position to move the insulator to a required position;

Fig. 6 is a side view of the towing device shown in Fig. 5 and viewed from the right of Fig. 5; and Fig. 7 is a view in perspective of a portion of a line wire, the insulator supported on the line wire and the towing device in position for moving the insulator to a required position on the line wire.

In systems of open wire lines of electrical communication systems it is necessary, where bare conductors are used as the line wires, to maintain the wires separated from each other to prevent them contacting.

The invention as shown in Figs. 1, 2, 3 and 4 comprises an insulating member 1 arranged to be positioned on a line wire 2 at predetermined points to maintain the line wire 2 spaced from the adjacent line wire a predetermined minimum distance at the points where the insulators are placed, the insulating member 1 having a radius equal at least to the required spacing for the line wires. The line wires 2 are supported on spaced poles 3—3 in the well-known manner. The insulating members 1 are positioned on the line wires 2 at predetermined points between the poles 3—3 and prevent the wires 2 from coming in contact with each other.

Figure 4:
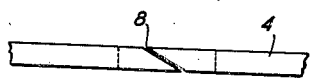
Fig. 4 is a bottom edge view of a portion of the insulator shown in Fig. 2.

The insulating member 1 comprises preferably a disc 4 of insulating material having a radial slot 6 extending to the center of the disc adapted to receive the line wire 2. Comparatively large apertures 7 are provided in the insulating disc 4 to reduce the surface area of the disc 4 and thereby reduce the wind resistance of the device. The apertures 7 also serve as openings through which gunshot pellets and other missiles aimed at the insulator may pass without striking the insulator. It is well known that insulators on line wires are often used as targets by persons not responsible for the maintenance of the communication system. The apertures 7, therefore, provide some means for reducing this hazard by discouraging their use as a target. The slot 6 is of sufficient width to receive a line wire 2 and extends from one of the apertures 7 to a point 5 in the center of the insulating disc 4. Directly in line with the slot 6 and extending from the same aperture 7 to the periphery of the insulating disc 4 is a slit 8. The slit 8 diagonally crosses a line projected longitudinally from the center of the slot 6 and forms a break in the periphery of the insulating disc 4 as shown in Fig. 4. By manually displacing from the normal plane of the insulating disc 4 portions of the periphery adjacent the slit 8, a sufficient opening may be obtained to permit the passing of the line wire 2 into the adjacent aperture 7. The line wire 2 may then be passed upward through the slot 6 to the point 5 in the center of the insulating disc 4. The insulating disc 4 may be made of sheet phenol fibre or other insulating material having the required stiffness for the purpose required and having sufficient flexibility to permit slight springing apart of the portions adjacent the slit 8, and the closing of those portions after admission of the line wire into aperture 7.

Figure 1:
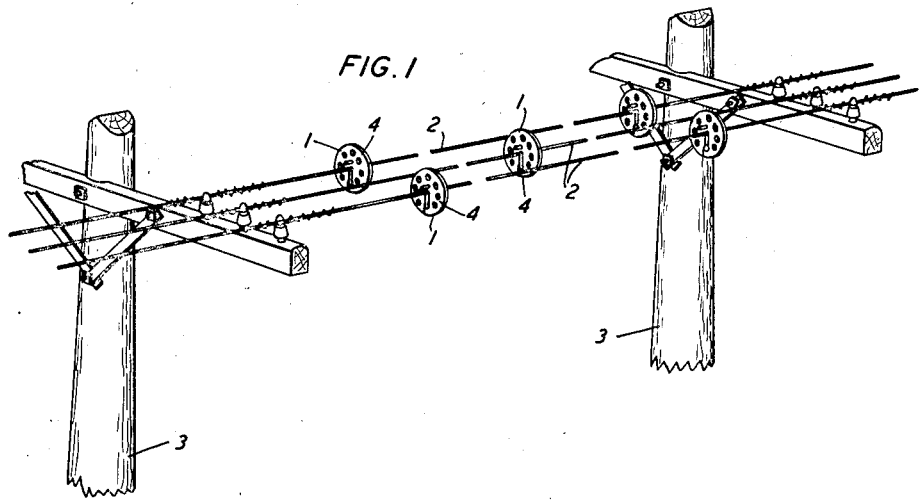
Fig. 1 shows a portion of a system of open wire lines supported on spaced poles with the present invention applied to the line wires.
Figure 2:
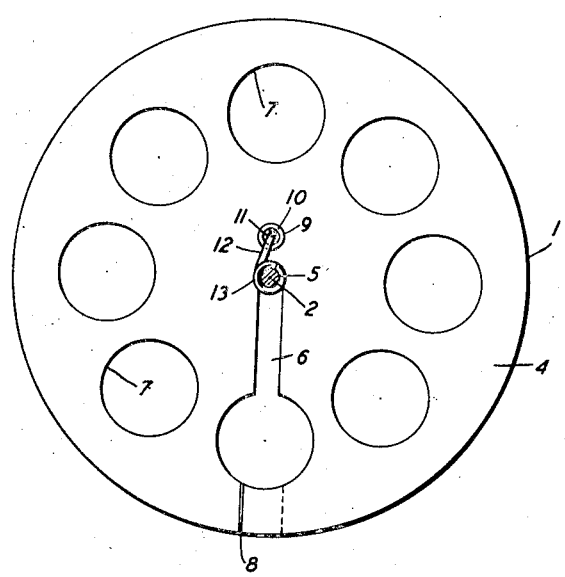
Fig. 2 is a plan view of the insulator applied to a line wire, the line wire being shown in cross-section.
Figure 3:
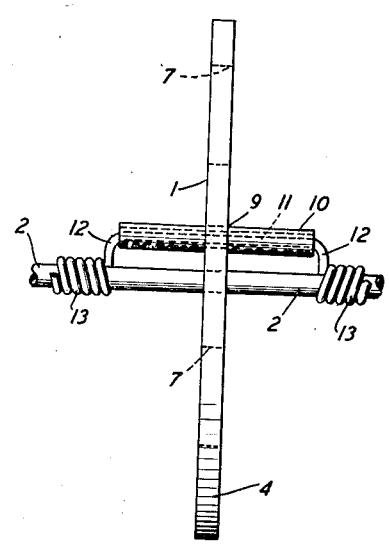
Fig. 3 is an edge view of the insulator shown in Fig. 2, viewed from either the right or left of Fig. 2.

Spaced a comparatively short distance from the center of the insulating disc 4, and preferably in alignment with the slot 6, is an aperture 9 which extends transversely through the insulating disc 4. Extending longitudinally through the aperture 9 is a tube 10, which is preferably force fitted in the aperture 9 or securely held in place in any suitable manner. The ends of the tube 10 extend outward from the opposite faces of the insulating disc 4 and perpendicular to the plane thereof. When the insulating member 1 is applied to the line wire 2 the tube 10 and line wire 2 are in parallel spaced relation. Extending longitudinally through the tube 10 is a wire 11 having portions 12—12 extending from ends of the tube 10 and bent downward at about 90 degrees relative to the tube 10. When the insulating member 1 is applied to the line wire 2, the free ends of the wire 11 are wrapped around the line wire 2 in helical turns 13—13 as shown in Fig. 3 to secure it in position on the line wire 2. The wire 11 holds the insulating disc 4 on the line wire 2 so that the line wire 2 passes through the center of the insulating disc 4 at a point 5 of the slot 6. The helical turns 13—13 of the ends of the wire 11 sufficiently grasp the line wire 2 to frictionally hold the insulating member 1 in the required position on the line wire 2 and prevents wind currents from sliding it longitudinally along the line wire 2.

While the helical turns 13—13 of the wire 11 around the line wire 2 will, if properly applied, prevent wind currents from sliding the insulating member 1 along the line wire 2, it may be readily towed to a required position on the line wire 2 by means of a suitable towing device 14 such as is shown in Figs. 5, 6 and 7. The towing device 14 shown in Figs. 5, 6 and 7 is a rectangular plate 15 preferably made of insulating material. On the lower end of the plate 15 are spaced weights 16—16 to retain the towing device 14 in an upright position as shown in Fig. 7. Secured in the upper corners of the plate 15 are bolts 17—17 having eyelet ends 18. A nut 19 and a locknut 20 on each bolt 17—17 serve to hold the bolts in required position. A bolt 21 having an eyelet end 22 and equipped with a holding nut 23 and a locknut 24 is secured to the lower end of the plate 15 between the weights 16—16. A slot 25 extends from the upper edge of the plate 15 downward through the middle of the plate to the center of the plate. The slot 25 is of sufficient width to readily receive a line wire 2. Spaced lugs 26—26 are provided on the front surface of the plate 15 on each side of the slot 25 and adjacent the top of the plate. The lower ends of the lugs 26—26 are shaped to fit the periphery of the insulating disc 4 and are preferably of greater thickness than the thickness of said disc. Tow lines 27 and 28 are attached to the bolts 17 and 21.

In applying the insulating member or disc 1 to the line wire 2 the insulator 1 is placed against the line wire 2 in a position to bring the diagonal slit 8 in line with the line wire 2. The portions of the disc 4 adjacent the slit 8 are manually displaced from their normal plane to widen the slit 8 sufficient to receive the line wire 2. The line wire 2 is then moved into the aperture 7 into which the slit 8 extends. The insulator 1 is manually moved relative to the line wire 2 to bring the line wire 2 into the point 5 of the slot 6 at the center of the disc. The ends of the wire 11 are then wrapped in helical turns 13—13 around the line wire 2, the helical turns 13—13 being made sufficiently tight about the line wire 2 to prevent rotation of the insulator 1 on the line wire 2. In order to move the insulator 1 to a required position on the line wire 2, the towing device 14 is lifted about the line wire 2 and adjacent the insulator 1 so that the line wire 2 passes through the slot 25. The towing device 14 is then moved against the insulator 1 and the lugs 26—26 are brought to rest on the upper edge of the insulator 1. The towing device 14 is thus supported by the insulator 1 and is retained in upright position as shown in Fig. 7 by the weights 16—16. By simultaneously pulling on the tow lines 27 and 28, in the direction required, a lineman may pull the insulator 1 along the line wire 2 to a required position. To release the towing device 14 from the insulator 1 it is only necessary to release the tow lines 27 and pull on the tow line 28. This action will cause sufficient displacement of the upper portion of the towing device 14 to bring the lugs 26—26 off the upper edge of the insulator 1. The towing device 14 will then drop away from the line wire 2 and the insulator 1.

What is claimed is:

1. An insulator for line wires comprising a comparatively stiff apertured disc of insulating material, a tube supported by said disc and extending transversely through said disc and projecting from opposite faces of said disc, a wire supported in said tube and having end portions projecting outwardly from said tube and adapted to be wrapped around the line wire to hold the insulator in a required position on the line wire, said tube being supported in said disc at a point offset relative to the diametrical center of said disc, a slot formed in said disc and extending from the diametrical center of said disc towards the periphery and a diagonal slit formed in the periphery of said disc and in communicating relationship with said slot, said slot being of sufficient width to readily receive a line wire and said slit being narrower than the diameter of the line wire but capable of enlargement by flexure of the peripheral portion of said disc adjacent the sides of the slit and said slot and said diagonal slit serving when said slit is enlarged to permit the placement of the insulator about a line wire so that the line wire extends transversely through the central portion of said disc.

2. An insulator for line wires comprising a comparatively stiff apertured disc of insulating material radially opened from its diametrical center and through its periphery to receive a line wire, the opening at the periphery being a slit narrower in width than the diameter of a line wire and extending diagonally across the outer edge of the disc, and the remaining portion of the opening in the disc being a slot of keyhole form of sufficient width to readily receive a line wire, a tube supported in said disc and extending transversely through said disc and a wire extending through said tube and having end portions extending outwardly from the ends of said tube and adapted to be wrapped around a line wire to hold the insulator in a required position, the slit in the periphery of the disc providing an opening capable of sufficient enlargement by flexure of the peripheral portion of said disc adjacent the slit to permit placement of the insulator about a line wire, the opening at the periphery of said disc and the slot of keyhole form serving as an opening through which the line wire may be brought to extend transversely through the insulator.

3. An insulator for line wires comprising an apertured disc of comparatively stiff insulating material radially opened from its diametrical center and through its periphery to permit placement of the insulator about a line wire so that the line wire will extend transversely through the central portion of said disc, a tube extending transversely through said disc and supported therein and a wire extending through said tube and projecting outwardly from the ends of said tube and serving as a means to hold the insulator on a line wire, the opening in the disc being in the form of a comparatively large aperture adjacent the periphery of the disc, a slit extending from the aperture and through the periphery of the disc and diagonally relative to the plane of the disc and an elongated slot extending from the aperture to the diametrical center of the disc, the slot and the aperture being sufficiently large to receive a line wire and the slit in the periphery of the disc being normally not of sufficient width to receive the line wire but being sufficiently enlargeable to receive the line wire by flexing portions of the disc adjacent the slit.

ARTHUR L. FOX.
FREDERIC V. HASKELL.
WILLIAM C. STURZENEGGER.